(12) United States Patent
Colotte et al.

(10) Patent No.: US 7,278,257 B2
(45) Date of Patent: Oct. 9, 2007

(54) TURBOJET ELECTROMECHANICAL THRUST REVERSER WITH SYNCHRONIZED LOCKING DEVICES

(75) Inventors: Baptiste Colotte, Melun (FR); Alexandre Courpied, Paris (FR); Marc Croixmarie, Auvernaux (FR); Patrick Joland, Evry Gregy sur Yerres (FR); Gilles Le Gouellec, Paris (FR); Marion Michau, Thiais (FR)

(73) Assignee: Hispano-Suiza, Colombes (FR)

( * ) Notice: Subject to any disclaimer, the term of this patent is extended or adjusted under 35 U.S.C. 154(b) by 892 days.

(21) Appl. No.: 10/691,692

(22) Filed: Oct. 24, 2003

(65) Prior Publication Data

US 2004/0139725 A1 Jul. 22, 2004

(30) Foreign Application Priority Data

Oct. 25, 2002 (FR) .................................. 02 13410

(51) Int. Cl.
*F02K 1/70* (2006.01)
*F02K 3/02* (2006.01)

(52) U.S. Cl. ............................. 60/226.2; 239/265.33; 244/110 B

(58) Field of Classification Search .............. 60/226.2, 60/230; 239/265.19, 265.25, 265.31, 265.33; 244/110 B
See application file for complete search history.

(56) References Cited

U.S. PATENT DOCUMENTS

| 4,391,409 | A | * | 7/1983 | Scholz | .................. | 239/265.29 |
| 4,409,884 | A | | 10/1983 | Boehringer | | |
| 5,720,449 | A | | 2/1998 | Laboure et al. | | |
| 5,960,626 | A | * | 10/1999 | Baudu et al. | ............... | 60/226.2 |
| 6,655,125 | B2 | * | 12/2003 | Johnson et al. | ............ | 60/226.2 |
| 6,926,234 | B2 | * | 8/2005 | Colotte et al. | .......... | 244/110 B |

FOREIGN PATENT DOCUMENTS

| EP | 0 542 611 A1 | 5/1993 |
| EP | 0 763 654 A1 | 3/1997 |
| EP | 0 843 089 A1 | 5/1998 |

OTHER PUBLICATIONS

U.S. Appl. No. 10/678,104, filed Oct. 6, 2003, Colotte et al.
U.S. Appl. No. 10/691,694, filed Oct. 24, 2003, Colotte et al.

* cited by examiner

*Primary Examiner*—Charles G Freay
(74) *Attorney, Agent, or Firm*—Oblon, Spivak, McClelland, Maier & Neustadt, P.C.

(57) ABSTRACT

A turbojet thrust reverser has two doors that are displaceable between a reverser open position and a reverser closed position, each door being controlled by a respective electronic control unit connected to a FADEC, and each door having a respective locking device for locking the position of the door associated therewith. Each locking device can be unlocked solely on receiving orders that come simultaneously from both electronic control units.

6 Claims, 2 Drawing Sheets

TURBOJET ELECTROMECHANICAL THRUST REVERSER WITH SYNCHRONIZED LOCKING DEVICES

A turbojet electromechanical thrust reverser with synchronized locking devices

BACKGROUND OF THE INVENTION

The present invention relates to the general field of thrust reversers for bypass turbojets. It relates more particularly to an electromechanical thrust reverser having at least two displaceable elements that co-operate, in the open position of the reverser, in producing thrust reversal, such as, for example, a thrust reverser having grids, doors, or shells.

Thrust reversers fitted to bypass turbojets are well known in the field of aviation. They serve to increase the safety of an airplane by providing assistance in braking during landing. Thrust reversers are generally in the form of at least two moving elements such as sliding doors which are capable of being displaced relative to the pod of the turbojet by means of control actuators so that, when operating to provide thrust reversal, i.e. when the in the open position, they constitute an obstacle for a fraction of the gas coming from the turbojet, which fraction is redirected forwards so as to provide the airplane with reverse thrust.

Thrust reversers are provided with various levels of locking, each level of locking being individually capable of holding the doors of the thrust reverser. Generally, these levels of locking are provided by three locking devices per reverser: a primary lock; a secondary lock; and a tertiary lock. Each of the locks is designed to withstand the loading on the doors in the event of the other two locks failing. The primary and secondary locks are controlled individually by a thrust reverser control unit, and the tertiary lock is controlled directly from the airplane cockpit.

In order to obtain good safety when opening and closing the reverser, it is necessary to ensure that control of the locks is synchronized between the doors, and in particular that control of their primary locks is synchronized. In thrust reversers of known type, the primary locks are controlled in parallel during reverser opening and closing sequences. There therefore exists no way of genuinely synchronizing their control to ensure that in the event of one of the primary locks becoming jammed, no action can be taken on the other primary lock. The absence of such synchronization between the control of the primary locks can be particularly damaging for the thrust reverser, particularly in the event of one of the locks failing or jamming.

OBJECT AND SUMMARY OF THE INVENTION

The present invention thus seeks to mitigate such a drawback by proposing a thrust reverser that makes it possible to achieve real synchronization in the control of the primary locks in order to guarantee good safety, particularly in the event of a breakdown of one of the control units for the reverser doors.

To this end, the invention provides a turbojet thrust reverser, comprising two doors displaceable between a reverser open position and a reverser closed position, each door being controlled by a respective electronic control unit connected to a full authority digital engine controller (FADEC); and two locking devices each enabling the position of the door associated therewith to be locked, each locking device being capable of being actuated solely on orders coming simultaneously from both electronic control units.

If one of these two orders is absent, then it is not possible to control the locking device of either door. As a result, control of the locking devices of the doors can be well synchronized. Furthermore, in the event of one of the two electronic control units breaking down, the locking devices remain in the locked position (if the breakdown occurs at the beginning of a sequence for opening the reverser), or they automatically brake the doors (if the breakdown occurs during displacement of the reverser), thereby improving reverser safety.

Preferably, each electronic control unit includes an electrical power supply unit connected to the locking device of the door with which it is associated via a switch, and a synchronizing unit controlling opening and closing of the switch associated with the locking device of the other door.

Advantageously, each locking device locks the door with which it is associated in position when it is not powered electrically, and unlocks said door when simultaneously the electrical power supply unit of the electronic control unit controlling said door delivers an electrical voltage and the synchronizing unit of the electronic control unit controlling the other door causes the switch associated with said locking device to conduct.

Each synchronizing unit is connected to both channels of said full authority digital engine controller.

Preferably, each door is associated with an abutment locking device controlled from the airplane cockpit.

BRIEF DESCRIPTION OF THE DRAWINGS

Other characteristics and advantages of the present invention appear from the following description given with reference to the accompanying drawings which show an embodiment having no limiting character. In the figures.

DETAILED DESCRIPTION OF AN EMBODIMENT

Figure 1:
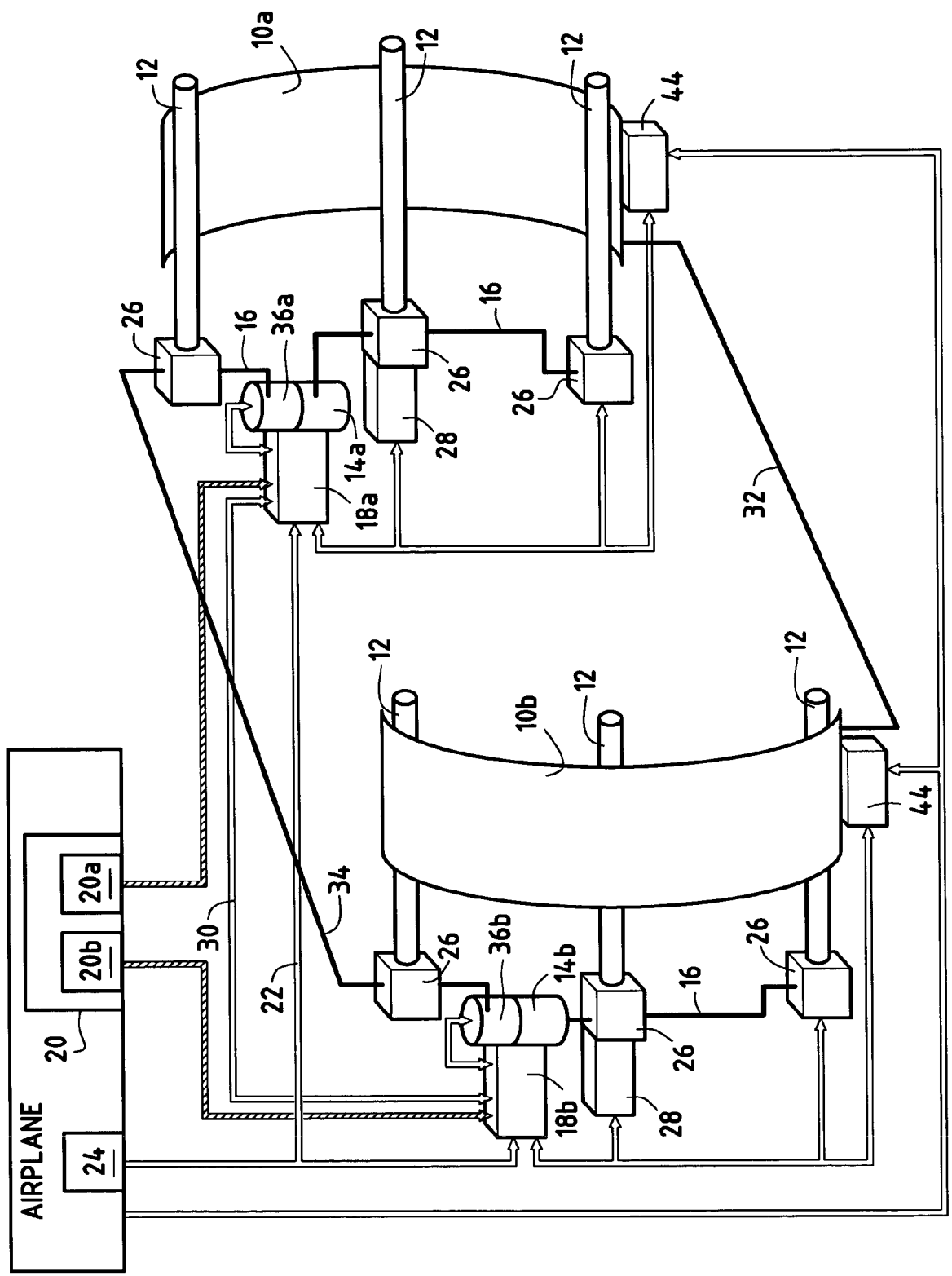
FIG. 1 is a diagram showing an embodiment of a thrust reverser of the invention.

Reference is made initially to FIG. 1 which shows an embodiment of a thrust reverser of the invention.

The thrust reverser has two doors 10a, 10b each displaceable between a reverser open position and a reverser closed position under drive from at least one control actuator 12 (three actuators per door are shown in FIG. 1, a central actuator and two actuators positioned at respective lateral extremities of each door).

The reverser further comprises two electric motors 14a, 14b each controlling the displacement of one of the doors. These electric motors drive the control actuators 12 of each of the doors 10a, 10b via respective transmission shafts 16 that interconnect the control actuators for each of the doors.

Each electric motor 14a, 14b is mounted directly on an electronic control unit 18a, 18b which controls the entire displacement sequence of the corresponding door and regulates the speed of rotation of the electric motor. Each electronic control unit 18a, 18b is electrically connected to one of the two channels 20a, 20b of a FADEC 20. The order to deploy or retract the thrust reverser is issued by the FADEC to the electronic units 18a, 18b. It is also possible to integrate the electronic units in the FADEC.

The electronic control units 18a, 18b are powered electrically via an electrical harness 22 connected to the electricity network 24 of the airplane on which the turbojet is mounted. The electronic control units transform and adapt the electrical signal in order to power the electric motors 14a, 14b.

The actuators 12 for controlling the doors of the reverser are of the electromechanical type. They are driven via gearboxes 26 mounted on each actuator. The control relationship (speed type control or on/off type control) for the doors 10a, 10b of the reverser is transmitted from the electronic units to each of the control actuators 12 via the electric motors 14a, 14b, the transmission shafts 16, and the gearboxes 26.

A drive socket 28 may be provided on one of the control actuators 12 so as to enable the door associated with the control actuator to be controlled manually, in particular while performing maintenance operations on the thrust reverser. In the example shown in FIG. 1, the central actuator 12 presents such a drive socket 28 on its gearbox 26. Since the gearboxes of each door are interconnected, the single socket enables an operator in charge of maintenance to open and/or close the doors of the reverser using a single handle, for example. Access to the drive socket 28 of each door may be electrically connected to the electronic control unit 18a, 18b so as to deactivate electrical power supply during such maintenance operations in order to avoid any untimely deployment of the reverser.

The electronic control units 18a, 18b may also exchange data between each other via a harness type electrical link 30. Such exchange of data between the two electronic units serves in particular to enable position information coming from the two doors to be compared. A mechanical link 32 between the two doors 10a, 10b and a flexible synchronizing shaft 34 interconnecting the actuators of the two doors may be provided in order to facilitate synchronizing the displacement of the two doors.

The thrust reverser has three levels of locking, each of which levels is capable, individually, of holding the doors of the thrust reverser.

A first level of locking is provided by a respective mechanical blocking device 36a, 36b referred to as a primary lock and associated with each door of the reverser. Each primary lock is mounted directly on the corresponding electric motor 14a, 14b and is controlled by the corresponding electronic unit 18a, 18b. Each primary lock 36a, 36b serves to hold the door with which it is associated. The primary locks are electrically controlled and operate on the absence of electricity principle, i.e. they remain in the door-locking position except when they are powered electrically. For example, they may be of the disk brake type or of the type achieving blocking by means of a peg that prevents the transmission shaft from turning.

Figure 2:
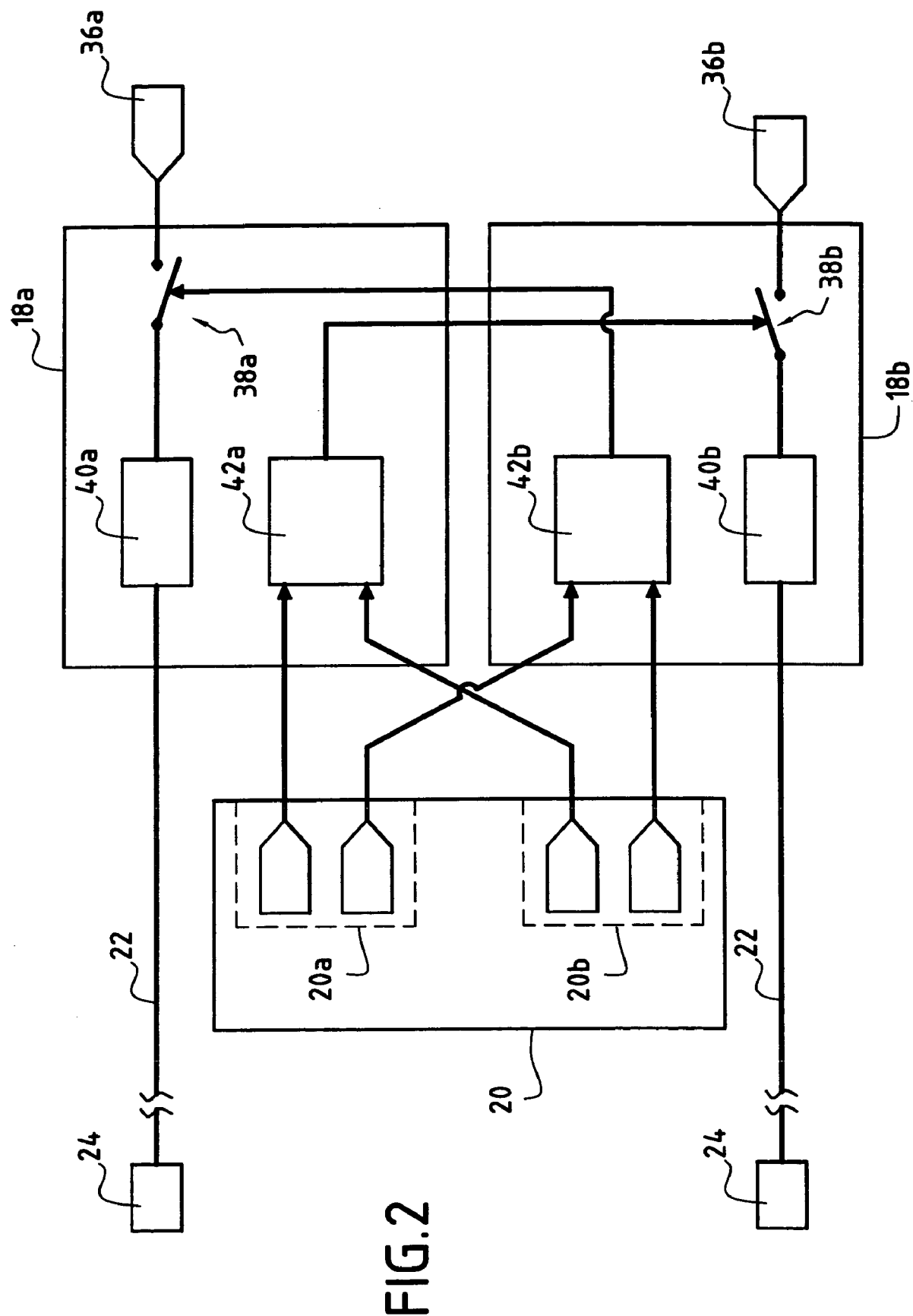
FIG. 2 is a partial block diagram of the thrust reverser embodiment shown in FIG. 1.

In the invention, and as shown in FIG. 2, each of the primary locks 36a, 36b is connected via a switch 38a, 38b to an electrical power supply unit 40a, 40b under the control of the electronic control unit 18a, 18b. Each of the electrical power units 40a, 40b receives an AC input voltage (e.g. at about 115 volts (V)) coming from the electricity network 24 of the airplane via the electrical harness 22. This input voltage is then rectified and filtered so as to deliver a DC output voltage (e.g. about 270 V) for powering the primary locks 36a, 36b.

In addition to the electrical supply units, each electronic unit 18a, 18b includes a synchronizing unit 42a, 42b for controlling opening and closing of the switch 38a, 38b for the primary lock of the door that is under the control of the other electronic unit. Thus, a command to power the primary locks 36a, 36b must be true simultaneously in both electronic units 18a, 18b. In order to be actuated, each primary lock needs to receive two signals simultaneously: firstly an electrical power supply signal coming from the electronic unit with which it is associated via its own electrical power supply unit 40a, 40b (this signal is represented by the delivery of an electrical voltage), and secondly a signal coming from the synchronizing unit 42b, 42a of the other electronic unit (with this signal causing the switch 38a, 38b associated therewith to be closed). If either one of these signals is missing, it is not possible to power either of the primary locks. The ability to apply power to each of the two primary locks 36a, 36b is enabled by means of the two electronic control units 18a, 18b because of the way the electrical power supply and the electrical control are shared between the two electronic control units.

In addition, given that the two doors 10a, 10b are mechanically linked by means of the links 32 and 34, the primary lock 36a, 36b of each of the doors 10a, 10b constitutes a second level of locking for the other door for which it constitutes a secondary lock. The secondary lock is designed to withstand the loading on the doors in the event of the primary lock failing. Thus, if the blocking device for one of the doors is considered as a primary lock, then the blocking device for the other door can be considered as being the corresponding secondary lock, and vice versa.

The third level of locking is provided by an abutment locking device 44 (see FIG. 1) referred to as a tertiary lock which is positioned at one of the lateral ends of each of the doors 10a, 10b or of one door only. These tertiary locks may be connected to the electronic units 18a, 18b, to the FADEC 20, and/or directly to the cockpit of the airplane. They are advantageously controlled directly from the airplane cockpit in order to provide sufficient operating safety and overcome any possible common mode. When connected to the FADEC or to the airplane cockpit, the tertiary locks remain operational even in the event of the electronic control units failing. They are designed to withstand the loading on the doors of the reverser in the event of the primary and secondary locks failing.

According to an advantageous characteristic of the invention, each synchronizing unit 42a, 42b in the electronic control units 18a, 18b is connected to both channels 20a, 20b of the FADEC 20. Thus, the FADEC issues two orders, a first order to one of the synchronizing units 42a, 42b and a second order to the other synchronizing unit. As a result, it is always possible to control the thrust reverser, even in the event of a breakdown in one of the two FADEC channels.

Synchronizing control of the primary locks 36a, 36b of the two doors in accordance with the invention presents numerous advantages, and in particular the following advantages:

in the event of a breakdown in one of the two electronic control units 18a, 18b at the beginning of a sequence for opening the reverser, both primary locks 36a, 36b remain in position for locking the doors, thereby increasing reverser safety. Under such circumstances, one of the primary locks is no longer powered electrically and the other lock can no longer receive confirmation of the order coming from the synchronizing unit; and given that the primary locks 36a, 36b operate on the lack of electricity principle, any electrical breakdown leading to loss of one or both of the electronic control units during displacement of the thrust reverser automatically causes the doors to be blocked by means of the primary locks. One of the locks will close because of the disappearance of its electrical power supply that enables it to remain open, while the other lock will close as well due to the loss of the order to open. This advantage applies particularly in the special case of excess speed being detected on one of the electric motors 14a, 14b, in which case it is possible to switch off the electrical power supply that enables the primary locks to be held open, in order to cause them to be relocked.

What is claimed is:

1. A turbojet thrust reverser, comprising:

two doors displaceable between a reverser open position and a reverser closed position, each door being controlled by a respective electronic control unit connected to a full authority digital engine controller having two channels; and two locking devices each enabling the position of the door associated therewith to be locked, each locking device being actuated solely upon simultaneously receiving a first and a second signal, the first signal coming from the respective electronic control unit and the second signal coming from the other electronic control unit.

2. A thrust reverser according to claim 1, wherein each electronic control unit includes an electrical power supply unit connected to the locking device of the door with which it is associated via a switch, and a synchronizing unit controlling opening and closing of the switch associated with the locking device of the other door.

3. A thrust reverser according to claim 2, wherein each locking device locks the door with which it is associated in position when it is not powered electrically, and unlocks said door when simultaneously the electrical power supply unit of the electronic control unit controlling said door delivers an electrical voltage and the synchronizing unit of the electronic control unit controlling the other door causes the switch associated with said locking device to conduct.

4. A thrust reverser according to claim 3, wherein each synchronizing unit is connected to both channels of said full authority digital engine controller.

5. A Thrust reverser according to claim 1, wherein each door is associated with an abutment locking device controlled from the cockpit of the plane on which said turbojet is designed to be mounted.

6. A turbojet, comprising a thrust reverser according to claim 1.

* * * * *